United States Patent
Denis et al.

[15] 3,704,945
[45] Dec. 5, 1972

[54] PHOTOPLOTTER ACCURATE FILM LOCATING MECHANISM

[72] Inventors: Richard E. Denis, Beverly; Joseph J. Sliwkowski, Framingham; Gilbert Fryklund, Winchester, all of Mass.

[73] Assignee: Computervision Corporation, Burlington, Mass.

[22] Filed: May 5, 1971

[21] Appl. No.: 140,349

[52] U.S. Cl. .....................355/40, 355/53, 355/54, 355/72
[51] Int. Cl. .............................................G03b 27/52
[58] Field of Search..........355/53, 54, 72, 86, 95, 40

[56] References Cited

UNITED STATES PATENTS 3,563,648   2/1971   Baggaley et al.....................355/53 X

*Primary Examiner*—Samuel S. Matthews
*Assistant Examiner*—Richard A. Wintercorn
*Attorney*—Chittick, Pfund, Birch, Samuels & Gauthier

[57] ABSTRACT

A mechanism for precisely determining the location coordinates of the photographic film sheet carried by a removable cassette mounted on the movable bed of a photoplotting machine. The cassette has registration pins which engage the prepunched film. The cassette also has a corner mount which has two right angled, upstanding, vertical faces that are square with the plane of the registration pins. A computer interfaced drive means horizontally moves the table holding the cassette so that the corner mount vertical faces sequentially contact the optical head of the photoplotter. A sensor in the optical head registers the contact data which is used by the computer to determine the coordinates of the film located relative to its underlying table.

9 Claims, 3 Drawing Figures

PATENTED DEC 5 1972 3,704,945

INVENTORS
RICHARD E. DENIS
JOSEPH SLIWKOWSKI
GILBERT FRYKLUND
BY Chittick, Pfund,
Birch, Samuels & Gauthier
ATTORNEYS

PHOTOPLOTTER ACCURATE FILM LOCATING MECHANISM

BACKGROUND OF THE INVENTION

Previous photoplotters have used various procedures to determine the location coordinates of the film to be exposed. This determination is necessary if subsequent layer to layer film registration uses are to be made. A common prior art procedure involves the use of mechanical microswitches. These switches introduce dimensional errors because they have a finite throw.

Some prior photoplotters simply ignored the problem caused by successive film sheets being mounted at slightly different bed locations. However, this limited the capability of using several masters as overlays.

A common prior procedure to determine the film location is to employ microswitches to detect film cassette location. However, these switches introduce dimensional errors because they have a finite throw.

It is an object of this invention to quickly and accurately carry out a routine which will reliably determine the location coordinates of the cassette mounted film sheet relative to the underlying bed. Another object is to accomplish this without complex expensive accessory equipment and without adding space consuming equipment to the photoplotter.

SUMMARY OF THE INVENTION

The present invention overcomes the problems of the prior art by utilizing a pressure sensitive transistor sensor which operates as a zero throw microswitch in registering physical contact data. An improved cassette is employed having upstanding film registration pins and a special raised corner mount having perpendicular vertical faces.

The interfaced computer program slews the cassette holding table back and forth causing the depending optical head to make sequential contacts with the corner mount vertical faces. When the contacts occur, the sensor registers the instantaneous table location coordinates. This information can be converted by computer calculation to determine the coordinates of the film itself because the registration pin locations relative to the corner mount location are known.

DESCRIPTION OF THE PREFERRED EMBODIMENT

Figure 1:
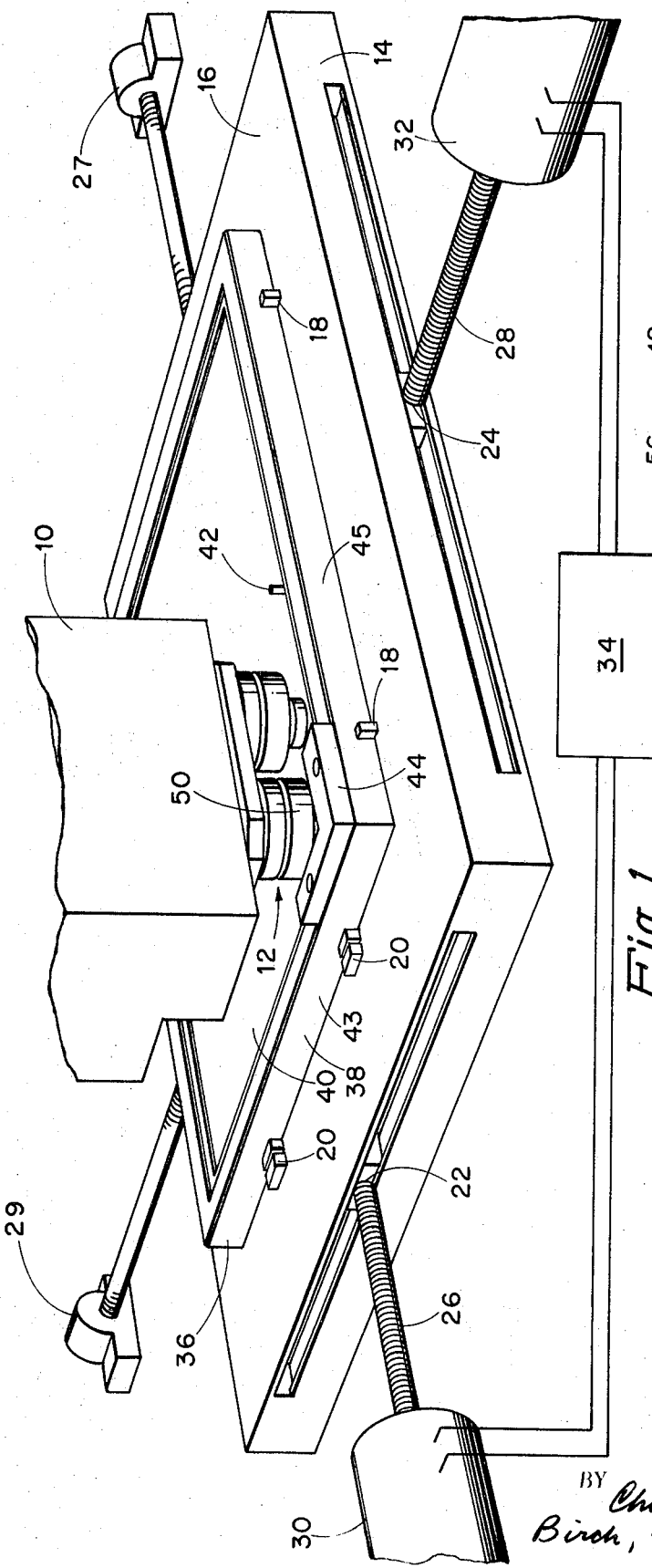
FIG. 1 is a perspective view of the optical head overhanging the film cassette which is mounted on the movable table.

FIG. 1 shows the photoplotter optical head 10 which includes one or more light sources adapted to pulse light down through one or more lenses 12. An unshown rotatable aperture disc has a large number of apertures containing transparent images of symbols and characters. These apertures are positioned between the light source and the lens.

An underlying table 14 has an upper horizontal surface 16. Stops 18 are mounted in surface 16 and extend upwardly therefrom on three sides of an imaginary rectangle. Spring-loaded stops 20 are provided on the fourth side of the imaginary rectangle.

Table 14 is quite substantial and rides on unshown underlying fame bearings which permit movement in any horizontal direction. Table 14 has a drilled and tapped passageway 22 running entirely through its upper portion and a similar drilled and tapped passageway 24 running through its lower portion at a right angle to passageway 22. Threaded shafts 26 and 28 are carried by bearings 27 and 29 in passageways 22 and 24 and are turned by electric stepper motors 30 and 32, respectively. These motors are preferably high speed, high torque and controllable at 200 steps per shaft revolution. It will be seen that the two stepper motors 30 and 32 can cooperate to slew the table 14 back and forth to any location in any path. An interfaced computer 34 is programmed to actuate the stepper motors to cause table 14 to move in a routine to accomplish the objects of this invention.

A removable cassette 36 has a rectangular frame 38 and a film supporting surface 40. Cassette 36 is preferably designed to accommodate a 15 X 15 inch film sheet although other size cassettes can also be employed with this invention so long as their physical configuration and dimensions are known. Cassette 36 is provided with at least two upstanding registration pins 42 mounted on and extending upwardly from film supporting surface 40. These pins are sized and shaped to exactly match the holes which are prepunched into the margins of the film sheets. Preferably, registration pins 42 are positioned so that a vertical plane passing through them is precisely parallel with the cassette frame ends 43 and is precisely perpendicular to the cassette frame sides 45. Also, the prepunched film holes should be aligned parallel to the film end edges and perpendicular to the film side edges.

It will be understood that this invention could also be practiced if the registration pins 42 were more than two in number or located other than square with the cassette frame ends and sides so long as the pin locations relative to the cassette geometry were known by the computer and the prepunched film holes were made to match.

A corner mount 44 is bolted to the cassette frame 38 and, in its preferred embodiment, forms a retaining wall having a first vertical face 46 parallel to the frame ends 43 and a second vertical face 48 parallel to the frame sides 45. Faces 46 and 48 are perpendicular to each other. Face 46 is parallel to the registration pin plane and face 48 is perpendicular to the registration pin plane. Preferably, faces 46 and 48 join together to form an integral corner mount, but this is not necessary. Faces 46 and 48 are horizontally aligned with the optics ring 50 of the optical head. This horizontal alignment allows table 14 to move horizontally with adequate clearance between optical head 10 and the underlying film. Furthermore, this horizontal alignment beings vertical faces 46 and 48 individually into contact with optics ring 50 when the programmed routine so requires.

Figure 3:
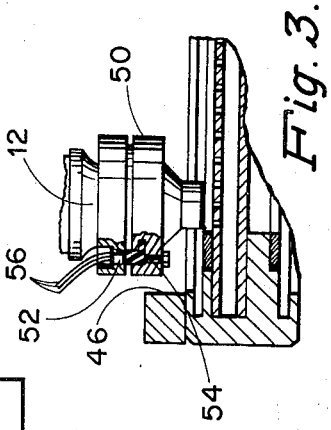
FIG. 3 is an elevational view showing the optical head and the cassette and corner mount, with portions of these elements partly cut away to show detail.

As can best be seen in FIG. 3, a sensor 52 is mounted in the lens mount of optical head 10. If the optical head has two lens mounts, the sensor is mounted in the lens mount nearest corner mount 44. Preferably, sensor 52 is a pressure sensitive transistor such as a silicon NPN planar transistor that has its emitter-base junction mechanically coupled to a diaphragm. A differential pressure applied to the diaphragm produces a large, reversible change in the gain of the transistor, i.e., the transistor's output is modulated by the mechanical variable. This invention has operated successfully using a PITRAN pressure sensitive transistor made by Stow Laboratories, Inc. of Hudson, Massachusetts. Sensor 52 is prestressed by bolt 54 to zero the signal and has three leads 56.

Figure 2:
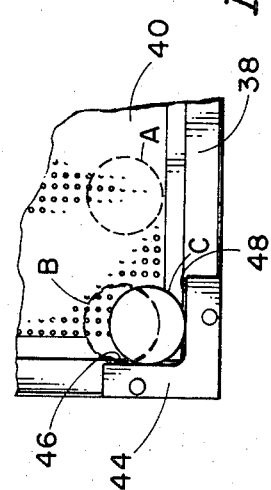
FIG. 2 is a top plan view of the cassette showing the corner mount and the position of the optical head relative to the corner mount at the three key points of underlying table travel.

With reference to FIG. 2, the programmed routine is for table 14 to first be moved to a position where the optical head 10 is approximately in the vicinity of corner mount 44 as shown by the dotted head location A. Then, table 14 is moved perpendicular to first retaining wall vertical face 46 until face 46 lightly contacts optics ring 50 as shown by dotted head location B. The shock of physical contact causes sensor 52 to respond whereupon table 14 stops and the table location coordinates are obtained. Table 14 is then backed away from optics ring 50 to provide clearance. Table 14 is then moved perpendicular to second retaining wall vertical face 48 until face 48 lightly contacts optics ring 50 as shown by solid head location C. Again, the sensor 52 responds to stop the table movement and to register the table location coordinates.

Therefore, the computer has received the table coordinates of the corner mount vertical faces. Previously, the known dimensions of the cassette and film had been given to the computer including the film size and the geometrical layout of the prepunched holes, the registration pins and the corner mount. With this known stored information, it requires only a simple calculation to determine the film location coordinates once the corner mount coordinates have been obtained.

This routine of determining the film coordinates regardless of cassette location on the table is also called accurate origining or accurate homing of the table.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

We claim:

1. In a photoplotting machine having an optical head including a light source shining through a lens; having a rotatable aperture disc containing a circle of spaced-apart apertures in which are mounted transparent images of symbols and characters, said disc positioned between the light source and the lens; having a movable table positioned beneath the lens, said table having cassette mounting means on its upper surface; and having a removable cassette in which photographic film, having precisely prepunched registration holes, is positioned to be exposed, said cassette mounted on the movable table and fixed in place by the cassette mounting means; the light source, the rotatable aperture disc, and the movable table all being actuated in response to an interfaced computer program to photograph the desired plot on the film; improved means for determining the exact film location on the movable table comprising:
   a. at least two registration pins mounted on and extending upwardly from the film supporting surface of the cassette, said cassette pins being sized and shaped to precisely engage the prepunched film holes;
   b. a first retaining wall mounted on the cassette having a vertical face, said first retaining wall vertical face being horizontally aligned with the optical head;
   c. a second retaining wall mounted on the cassette having a vertical face disposed at an angle to said first retaining wall vertical face, said second retaining wall vertical face being horizontally aligned with the optical head;
   d. sensor means for precisely registering the exact instant the optical head physically contacts a retaining wall vertical face; and
   e. computer interfaced drive means for storing the known geometrical data concerning the precise location coordinate plot of said registration pins and said retaining wall vertical faces, and for moving the cassette-carrying table horizontally to cause said first and said second retaining wall vertical faces to sequentially contact the optical head
   whereby the computer calculates and stores in its memory the location coordinates of the table at the instants of contact between the optical head and said retaining wall vertical faces, and further calculates therefrom and stores the location coordinates of the registered film.

2. Apparatus of claim 1 wherein said two registration pins are mounted on said cassette in a vertical plane which is parallel to the cassette frame ends and perpendicular to the cassette frame sides and the film prepunched registration holes are aligned parallel to the film end edges and perpendicular to the film side edges.

3. Apparatus of claim 1 wherein said first retaining wall vertical face is perpendicular to said second retaining wall vertical face.

4. Apparatus of claim 2 wherein said first retaining wall vertical face is perpendicular to said second retaining wall vertical face and said first retaining wall vertical face is parallel to the registration pin plane and said second retaining wall vertical face is perpendicular to the registration pin plane.

5. Apparatus of claim 1 wherein said first and second retaining walls comprise an integral unit mounted on a corner of the cassette.

6. Apparatus of claim 1 wherein said sensor means comprises a pressure sensitive transistor.

7. Apparatus of claim 6 wherein said pressure sensitive transistor is mounted in the optical head.

8. Apparatus of claim 1 wherein said drive means for moving the cassette-carrying table comprises a pair of threaded shafts engaging the table at a right angle and a pair of electric stepper motors drivably engaged to said pair of threaded shafts.

9. Apparatus of claim 1 wherein said drive means causes the table to initially travel to a position where said retaining walls are in the general area of the optical head; said drive means then causes the table to move perpendicular to said first retaining wall vertical face until the optical head is contacted thereby; said drive means then causes the table to move in the reverse direction a small distance to provide clearance from said first retaining wall vertical face; and said drive means finally causes the table to move perpendicular to said second retaining wall vertical face until the optical head is contacted thereby.

* * * * *